United States Patent
Agiwal et al.

(10) Patent No.: US 11,930,551 B2
(45) Date of Patent: Mar. 12, 2024

(54) METHOD AND APPARATUS FOR HANDLING SYSTEM INFORMATION REQUEST IN WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 17/122,908

(22) Filed: Dec. 15, 2020

(65) Prior Publication Data
US 2021/0185758 A1    Jun. 17, 2021

Related U.S. Application Data

(60) Provisional application No. 62/949,252, filed on Dec. 17, 2019.

(51) Int. Cl.
*H04W 76/27* (2018.01)
*H04W 72/30* (2023.01)

(52) U.S. Cl.
CPC .......... *H04W 76/27* (2018.02); *H04W 72/30* (2023.01)

(58) Field of Classification Search
CPC ... H04W 76/27; H04W 72/005; H04W 48/14; H04W 36/0077; H04W 36/0055; H04W 36/0016; H04W 36/0005; H04W 74/006
See application file for complete search history.

(56) References Cited

U.S. PATENT DOCUMENTS

| 2015/0215965 A1* | 7/2015 | Yamada | H04W 76/22 |
| | | | 370/329 |
| 2015/0249952 A1 | 9/2015 | Lee et al. | |
| 2017/0251500 A1 | 8/2017 | Agiwal et al. | |
| 2018/0302844 A1* | 10/2018 | Liu | H04W 48/16 |
| 2019/0158988 A1 | 5/2019 | Lee et al. | |
| 2019/0254074 A1* | 8/2019 | Jeon | H04W 74/02 |

(Continued)

FOREIGN PATENT DOCUMENTS

| EP | 3409048 A1 | 12/2018 |
| WO | 2017150863 A1 | 9/2017 |

(Continued)

OTHER PUBLICATIONS

3GPP TS 38.331 Sep. 2019 (Year: 2019).*

(Continued)

*Primary Examiner* — Sudesh M Patidar

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides method and apparatus for managing system information in a wireless communication system.

20 Claims, 5 Drawing Sheets

(56) References Cited

U.S. PATENT DOCUMENTS

| | | | | |
|---|---|---|---|---|
| 2019/0342824 A1* | 11/2019 | Futaki | | H04W 36/14 |
| 2019/0349837 A1* | 11/2019 | Shih | | H04W 76/11 |
| 2020/0296633 A1* | 9/2020 | Michalopoulos | | |
| | | | | H04W 36/0016 |
| 2020/0337108 A1* | 10/2020 | Wu | | H04W 48/20 |
| 2021/0105788 A1* | 4/2021 | Kim | | H04W 72/005 |
| 2021/0105852 A1* | 4/2021 | Shih | | H04L 5/0053 |
| 2022/0015021 A1* | 1/2022 | Tao | | H04W 48/10 |

FOREIGN PATENT DOCUMENTS

| | | | | |
|---|---|---|---|---|
| WO | 2017/196056 A2 | | 11/2017 | |
| WO | WO-2019217782 A1 | * | 11/2019 | ............ H04W 48/10 |

OTHER PUBLICATIONS

International Search Report of the International Searching Authority in connection with International Application No. PCT/KR2020/018273 dated Mar. 19, 2021, 3 pages.

3rd Generation Partnership Project; Technical Specification Group Radio Access Network; NR; Radio Resource Control (RRC) protocol specification (Release 15), 3GPP TS 38.331, V15.7.0, Sep. 2019, 527 pages.

Qualcomm Incorporated, "Broadcast of Location Assistance Data by NG-RAN", 3GPP TSG-RAN WG2 Meeting #107bis, R2-1913398 (Revision of R2-1909421), Chongqing, China, Oct. 14-18, 2019, 33 pages.

Huawei, et al., "Discussion on broadcasting of positioning assistance data", 3GPP TSG-RAN WG2 Meeting #107bis, R2-1913038, Chongqing, China, Oct. 14-18, 2019, 11 pages.

Intel Corporation, "SI reception during handover", 3GPP TSG-RAN WG2 NR AdHoc #1807, May 2-25, 2018, R2-1809786, 7 pages.

Samsung, "ReconfigurationWithSync and Random Access (offline discussion 20)", 3GPP TSG-RAN WG2 Meeting #103bis, Oct. 8-12, 2018, R2-1815991, 5 pages.

Samsung, "Remaining Issues of on Demand SI Procedure in RRC Connected", 3GPP TSG-RAN2 109, Feb. 24-28, 2019, R2-2000228, 9 pages.

Ericsson, "On-demand SIB in Connected Functionality", 3GPP TSG-RAN WG2 Meeting #109-e, Feb. 24-Mar. 6, 2020, R2-2002227, 19 pages.

Supplementary European Search Report dated Dec. 16, 2022 in connection with European Patent Application No. 20 90 4177, 15 pages.

* cited by examiner

METHOD AND APPARATUS FOR HANDLING SYSTEM INFORMATION REQUEST IN WIRELESS COMMUNICATION SYSTEM

CROSS-REFERENCE TO RELATED APPLICATION

This application is based on and claims priority under 35 U.S.C. § 119 to U.S. Provisional Patent Application No. 62/949,252, filed on Dec. 17, 2019, in the USPTO, the disclosure of which is incorporated by reference herein in its entirety.

BACKGROUND

1. Field

The disclosure relates to a wireless communication system. Specifically, the disclosure relates to an apparatus, a method and a system for managing system information in radio resource control (RRC) connected state in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance current procedure for managing system information in next generation wireless communication system.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: receiving, while the terminal being in a radio resource control (RRC) connected state, an RRC message including a system information block 1 (SIB1) and information associated with a reconfiguration with sync for a target special cell (SpCell); identifying that the terminal has not stored a valid version of at least one required SIB based on the SIB1; transmitting, to the target SpCell, a dedicated SIB request message for the at least one required SIB after a random access procedure to the target SpCell is completed.

In accordance with an aspect of the disclosure, a method performed by a target SpCell is provided. The method comprises: performing a random access procedure with a terminal in a radio resource control (RRC) connected state with a source SpCell; and receiving, from the terminal, a dedicated system information block (SIB) request message for at least one required SIB after the random access procedure is completed, in case that the terminal has not stored a valid version of the at least one required SIB, wherein the random access procedure is performed in case that the terminal has received, from the source SpCell, an RRC message including a SIB1 and information associated with a reconfiguration with sync for the target SpCell.

In accordance with an aspect of the disclosure, a terminal is provided. The terminal comprises a transceiver configured to transmit and receive a signal; and a controller configured to: receive, while the terminal being in a radio resource control (RRC) connected state, an RRC message including a system information block 1 (SIB1) and information associated with a reconfiguration with sync for a target special cell (SpCell), identify that the terminal has not stored a valid version of at least one required SIB based on the SIB1, transmit, to the target SpCell, a dedicated SIB request message for the at least one required SIB after a random access procedure to the target SpCell is completed.

In accordance with an aspect of the disclosure, a target SpCell is provided. The target SpCell comprises a transceiver configured to transmit and receive a signal; and a controller configured to: perform a random access procedure with a terminal in a radio resource control (RRC) connected state with a source SpCell, and receive, from the terminal, a dedicated system information block (SIB) request message for at least one required SIB after the random access procedure is completed, in case that the terminal has not stored a valid version of the at least one required SIB, wherein the random access procedure is performed in case that the terminal has received, from the source SpCell, an RRC message including a SIB1 and information associated with a reconfiguration with sync for the target SpCell.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
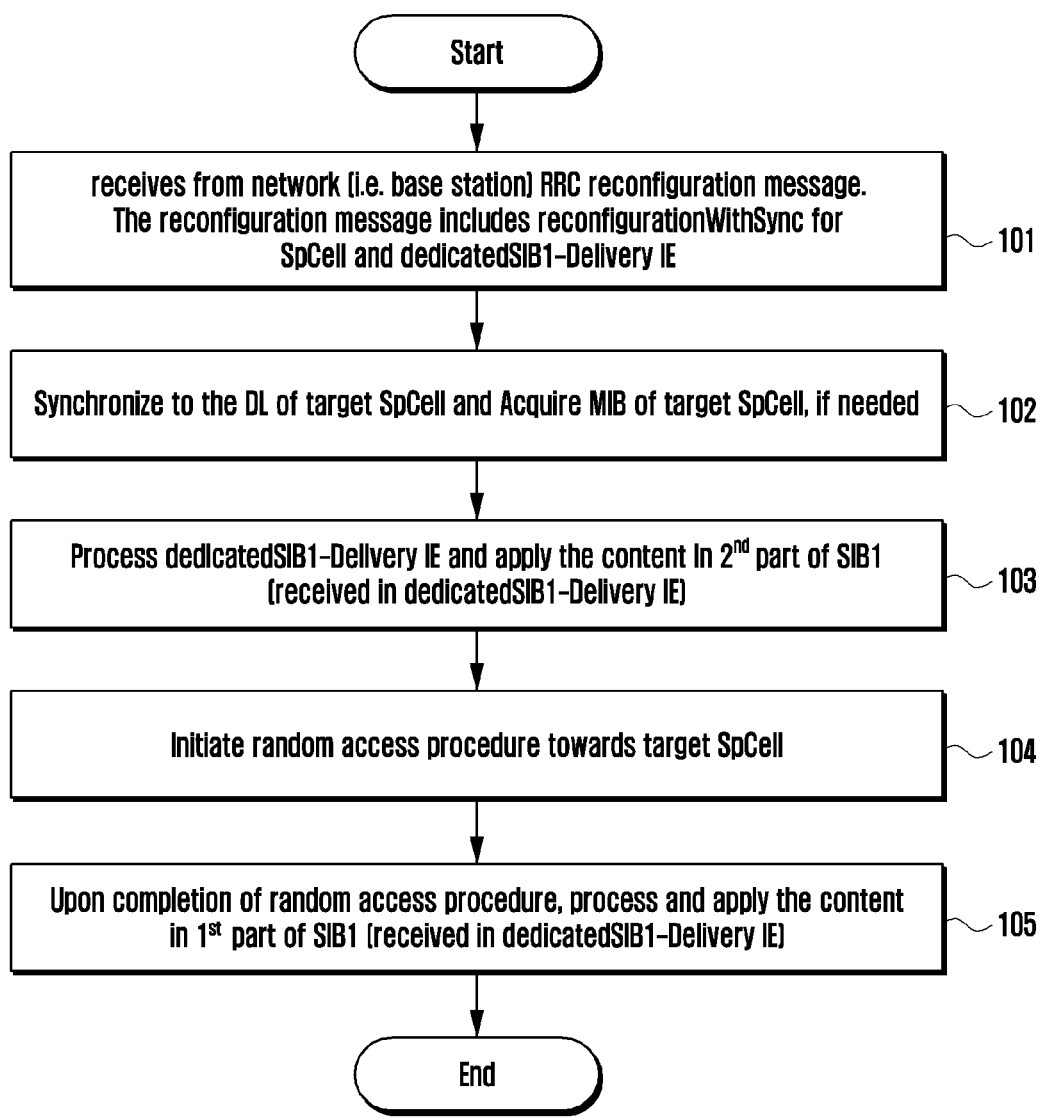
FIG. 1 illustrates a flowchart of processing of SIB1 in handover procedure in accordance with an embodiment of the disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (B S)" is an entity communicating with a user equipment (UE) and may be referred to as BS, base transceiver station (BTS), node B (NB), evolved NB (eNB), access point (AP), 5G NB (5GNB), or gNB (next generation node B).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive MIMO, FD-MIMO, array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc.

However, it is expected that the design of the air-interface of the fifth generation wireless communication system would be flexible enough to serve the UEs having quite different capabilities depending on the use case and market segment the UE cater service to the end customer. Few exemplary use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fifth generation wireless communication system operating in higher frequency (e.g., mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased.

The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either Evolved Universal Mobile Telecommunications System (UMTS) Terrestrial Radio Access (E-UTRA (i.e., if the node is an ng-eNB)) or NR access (i.e., if the node is a gNB). In NR for a UE in RRC_CONNECTED not configured with carrier aggregation (CA)/DC, there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (SCells). In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

In the fifth generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid-automatic repeat request (ARQ) information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the Physical Resource Block(s) (PRB(s)) and Orthogonal Frequency Division Multiplexing (OFDM) symbol(s) where the UE may assume no transmission is intended for the UE; Transmission of transmission power command (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. Quadrature Phase Shift Keying (QPSK) modulation is used for PDCCH.

In fifth generation wireless communication system, a list of search space configurations is signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbol s-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot})\bmod(\text{Monitoring-periodicity-PDCCH-slot})=0; \quad [\text{Equation 1}]$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations is signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each coreset configuration is associated with a list of TCI (Transmission configuration indicator) states. One DL reference signal (RS) ID (either SSB or channel state information RS (CSI-RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI-RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the Medium Access Control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve UL time synchronization. RA is used during initial access, handover, RRC connection re-establishment procedure, scheduling request transmission, SCG addition/modification, beam failure recovery and data or control information transmission in UL by non-synchronized UE in RRC CONNECTED state. Several types of random access procedure are supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on PDSCH. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+ 14*t_id+14*80*f_id+14*80*8*ul_carrier_id, where s_id is the index of the first OFDM symbol of the PRACH occasion where UE has transmitted Msg1, i.e. RA preamble; $0 \leq s\_id < 14$; t_id is the index of the first slot of the PRACH occasion ($0 \leq t\_id < 80$); fid is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR MAC protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e., select random access resource (preamble/RACH occasion) and transmits the RA preamble. A backoff period may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e., select random access resource (preamble/RACH occasion) and transmits the RA preamble. A backoff period may be applied before going back to first step.

Contention free random access (CFRA): This is also referred as legacy CFRA or 4 step CFRA. CFRA procedure is used for scenarios such as handover where low latency is required, timing advance establishment for Scell, etc. Evolved node B (or gNB) assigns to UE dedicated Random access preamble. UE transmits the dedicated RA preamble. ENB (or gNB) transmits the RAR on PDSCH addressed to RA-RNTI. RAR conveys RA preamble identifier and timing alignment information. RAR may also include UL grant. RAR is transmitted in RAR window similar to CBRA procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e., during random access resource selection for Msg1 transmission, UE determines whether to transmit dedicated preamble or non-dedicated preamble. Dedicated preambles are typically provided for a subset of SSBs/CSI-RSs. If there is no SSB/CSI RS having DL reference signal received power (RSRP) above a threshold amongst the SSBs/CSI-RSs for which contention free random access resources (i.e., dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e., upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e., UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/transmission and reception point (TRP) switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e., during random access resource selection for MsgA transmission UE determines whether to transmit dedicated preamble or non-dedicated preamble. Dedicated preambles are typically provided for a subset of SSBs/CSI-RSs. If there is no SSB/CSI-RS having DL RSRP above a threshold amongst the SSBs/CSI RSs for which contention free random access resources (i.e., dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-ThresholdSSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.
    else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

In the fifth generation wireless communication system, node B (or gNB) or base station in cell broadcast Synchronization Signal and physical broadcast channel (PBCH) block (i.e., SSB) consists of primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

the MIB is always transmitted on the BCH with a periodicity of 80 milliseconds (ms) and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

UE acquires SIB 1 from the camped or serving cell. UE check the BroadcastStatus bit in SIB 1 for SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If SI message which UE needs to acquire is not being broadcasted (i.e., BroadcastStatus bit is set to zero), UE initiates transmission of SI request. The procedure for SI request transmission is as follows:

If SI request configuration is signaled by gNB for SUL, and criteria to select SUL is met (i.e., RSRP derived from SSB measurements of camped or serving cell<rsrp-ThresholdSSB-SUL, where rsrp-ThresholdSSB-SUL is signaled by gNB (e.g., in broadcast signaling such as SIB1)): UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e., Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): UE initiate transmission of SI request based on Msg1 based SI request on NUL. In other words, UE initiates Random Access procedure using the PRACH preamble(s) and PRACH resource(s) in SI request configuration of NUL. UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiate transmission of SI request based on Msg3 based SI request. In other words, UE initiate transmission of RRCSystemInfoRequest message. UE transmits Msg1 (i.e., Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e., RRCSystemInfoRequest message). If acknowledgement for SI request (i.e., RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell<rsrp-ThresholdSSB-SUL where rsrp-ThresholdSSB-SUL is signaled by gNB (e.g., in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g., in broadcast signaling such as SIB1).

However, there are some issues in current SI request procedures.

Issue 1: Delay of Handover Completion when Dedicated SIB1 Configured

SI request mechanism is being enhanced to enable UE to request SI in RRC Connected state. According to existing procedure, UE can receive a handover command (i.e., RRC reconfiguration message including reconfiguration with sync) from source SpCell. If the handover command includes dedicatedSIB1-Delivery IE, RRC in UE performs actions upon reception of the SIB1 as specified in TS 38.331 before triggering RRCReconfigurationComplete message. dedicatedSIB1-Delivery IE provides the SIB1 of target cell. As part of SIB 1 processing triggered due to reception of dedicatedSIB1-Delivery IE, if UE requires SIB(s) other than SIB1 in RRC Connected state and those are not being broadcasted in target cell as per received SIB1, Dedicated-SIBRequest is triggered. As a result, DedicatedSIBRequest will be in queue before the RRCReconfigurationComplete, which delays the transmission of RRCReconfigurationComplete and hence handover completion.

Issue 2: Failure to Acquire SIBs in RRC State

UE is in RRC Connected state. UE wants to receive a SIB (e.g., V2X is activated and UE needs V2X SIB). UE first needs to acquire SIB 1.

If si-BroadcastStatus is set to notBroadcasting for the required SIB in SIB1, UE trigger DedicatedSIBRequest. Otherwise, UE acquire the SI message of the required SIB from broadcast. In RRC Connected state, if common search space is not configured in active DL BWP, UE cannot acquire SIB1. As a result, UE cannot acquire the required SIB.

The disclosure provides methods and apparatuses for handling the issues above. Hereinafter, the embodiments disclosed in the disclosure may be freely combined or reconfigured by those skilled in the art, and for example, each part of the embodiments may be combined with each other to form one embodiment.

Embodiment 1—SI Request Upon Receiving SIB1 in Handover Procedure

Embodiment 1-1

In one method of this disclosure, the processing of SIB1 is split in two parts:
  1st part includes processing of si-SchedulingInfo;
  2nd part includes processing of contents (parameters/IEs) other than si-SchedulingInfo.

FIG. 1 illustrates a flowchart of processing of SIB1 in handover procedure in accordance with an embodiment of the disclosure.

In step 101, UE receives from network (i.e., base station) RRC reconfiguration message including reconfigurationWithSync IE (in SpCellConfig of MCG) and dedicatedSIB1-Delivery IE.

In step 102, RRC layer in UE processes reconfiguration with sync:
  1> start timer T304 for the corresponding SpCell with the timer value set to t304, as included in the reconfigurationWithSync;
  1> if the frequencyInfoDL is included:
    2> consider the target SpCell to be one on the SSB frequency indicated by the frequencyInfoDL with a physical cell identity indicated by the physCellId;
  1> else:
    2> consider the target SpCell to be one on the SSB frequency of the source SpCell with a physical cell identity indicated by the physCellId;
  1> start synchronising to the DL of the target SpCell;
  1> apply the pre-defined BCCH configuration;
  1> acquire the MIB, if needed
  1> reset the MAC entity of this cell group;
  1> consider the SCell(s) of this cell group, if configured, to be in deactivated state;
  1> apply the value of the newUE-Identity as the C-RNTI for this cell group;

In step 103, RRC layer in UE processes dedicatedSIB1-Delivery IE and applies the content in 2nd part of SIB1:
  1> if the cellAccessRelatedInfo contains an entry with the PLMN-Identity of the selected PLMN:
    2> in the remainder of the procedures use plmn-IdentityList, trackingAreaCode, and cellIdentity for the cell as received in the corresponding PLMN-IdentityInfo containing the selected PLMN;
  1> disregard the frequencyBandList, if received, while in RRC_CONNECTED;
  1> forward the cellIdentity to upper layers;
  1> forward the trackingAreaCode to upper layers;
  1> apply the configuration included in the servingCellConfigCommon;

In step 104, RRC layer initiates transmission of RRC reconfiguration complete message, and this triggers initiation of random access procedure towards target SpCell.

In step 105, upon completion of random access procedure, RRC layer in UE processes dedicatedSIB1-Delivery IE and applies the content in 1st part of SIB1 as follows:
  if the UE has a stored valid version of a SIB, that the UE requires to operate within the cell:
  use the stored version of the required SIB;
  if the UE has not stored a valid version of a SIB, of one or several required SIB(s):
  for the SI message(s) that, according to the si-SchedulingInfo, contain at least one required SIB and for which si-BroadcastStatus is set to broadcasting: acquire the SI message(s) from broadcast;
  for the SI message(s) that, according to the si-SchedulingInfo, contain at least one required SIB and for which si-BroadcastStatus is set to notBroadcasting: trigger DedicatedSIBRequest to acquire the required SIB(s).

Alternatively, in step 105, upon completion of random access procedure, RRC layer in UE processes dedicatedSIB1-Delivery IE and applies the content in 1st part of SIB1 as follows:
  if the UE has a stored valid version of a SIB, that the UE requires to operate within the cell:
  use the stored version of the required SIB;
  if the UE has not stored a valid version of a SIB, of one or several required SIB(s):
  if common search space is configured in active DL BWP:
  for the SI message(s) that, according to the si-SchedulingInfo, contain at least one required SIB and for which si-BroadcastStatus is set to broadcasting: acquire the SI message(s) from broadcast;
  for the SI message(s) that, according to the si-SchedulingInfo, contain at least one required SIB and for which si-BroadcastStatus is set to notBroadcasting: trigger DedicatedSIBRequest to acquire the required SIB(s).
  else
  trigger DedicatedSIBRequest to acquire the required SIB(s).

According to another embodiment of the disclosure, in step 105, upon completion of random access procedure, RRC layer in UE processes dedicatedSIB1-Delivery IE and applies the content in 1st part of SIB1 as follows:

if the UE has a stored valid version of a SIB, that the UE requires to operate within the cell:
use the stored version of the required SIB;
if the UE has not stored a valid version of a SIB, of one or several required SIB(s):
trigger DedicatedSIBRequest to acquire the required SIB(s).

Embodiment 1-2

Figure 2:
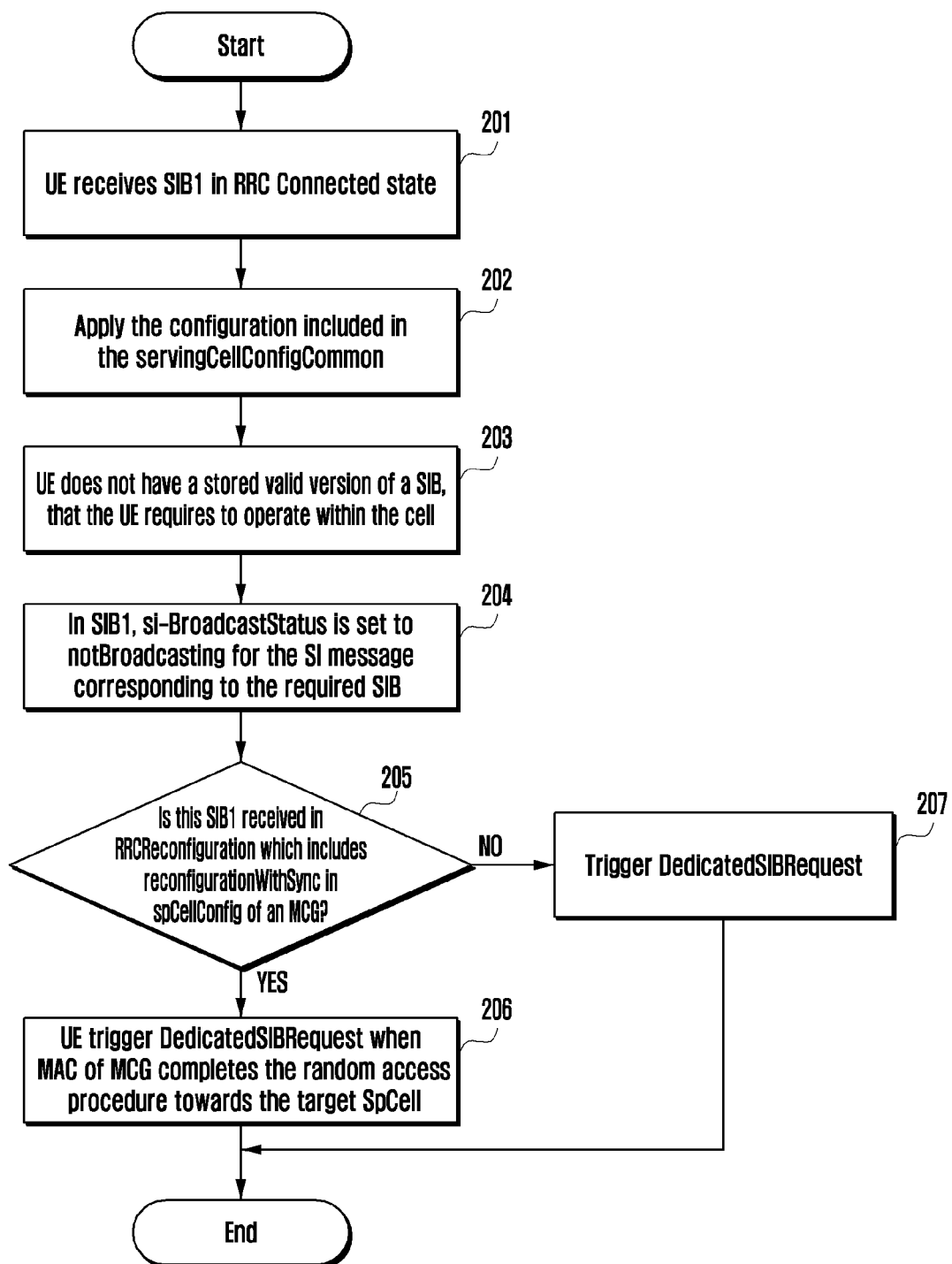
FIG. 2 illustrates a flowchart of processing of SIB1 received in RRC connected state in accordance with one embodiment of the disclosure.

FIG. 2 illustrates a flowchart of processing of SIB1 received in RRC connected state in accordance with one embodiment of the disclosure.

In step 201, UE receives SIB 1 in RRC Connected state. SIB 1 may be received in RRC reconfiguration message or acquired by UE from broadcast.

UE processes SIB 1 as follows:
if the cellAccessRelatedInfo contains an entry with the PLMN-Identity of the selected PLMN:
in the remainder of the procedures use plmn-IdentityList, trackingAreaCode, and cellIdentity for the cell as received in the corresponding PLMN-IdentityInfo containing the selected PLMN;
disregard the frequencyBandList, if received, while in RRC_CONNECTED;
forward the cellIdentity to upper layers;
forward the trackingAreaCode to upper layers;
apply the configuration included in the servingCellConfigCommon (202);
if the UE has a stored valid version of a SIB, that the UE requires to operate within the cell:
use the stored version of the required SIB;
if the UE has not stored a valid version of a SIB, of one or several required SIB(s) (203):
for the SI message(s) that, according to the si-SchedulingInfo, contain at least one required SIB and for which si-BroadcastStatus is set to broadcasting: acquire the SI message(s) from broadcast;
for the SI message(s) that, according to the si-SchedulingInfo, contain at least one required SIB and for which si-BroadcastStatus is set to notBroadcasting (204):
If this SIB1 is received in RRCReconfiguration which includes reconfigurationWithSync in spCellConfig of an MCG (205):
UE trigger DedicatedSIBRequest when MAC of MCG completes the random access procedure towards the target SpCell (206)
Else:
trigger DedicatedSIBRequest to acquire the required SIB(s) (207).
Alternatively, in step 203, if the UE has not stored a valid version of a SIB, of one or several required SIB(s):
for the SI message(s) that, according to the si-SchedulingInfo, contain at least one required SIB and for which si-BroadcastStatus is set to broadcasting and common search space is configured in active DL BWP: acquire the SI message(s) from broadcast;
for the SI message(s) that, according to the si-SchedulingInfo, contain at least one required SIB and for which si-BroadcastStatus is set to notBroadcasting or common search space is not configured in active DL BWP:
If this SIB1 is received in RRCReconfiguration which includes reconfigurationWithSync in spCellConfig of an MCG:
UE trigger DedicatedSIBRequest when MAC of MCG completes the random access procedure towards the target SpCell
Else:
trigger DedicatedSIBRequest to acquire the required SIB(s) (207).

According to another embodiment of the disclosure, in step 203, if the UE has not stored a valid version of a SIB, of one or several required SIB(s):
If this SIB1 is received in RRCReconfiguration which includes reconfigurationWithSync in spCellConfig of an MCG:
UE trigger DedicatedSIBRequest when MAC of MCG completes the random access procedure towards the target SpCell
Else if this SIB1 is received in RRCReconfiguration
trigger DedicatedSIBRequest to acquire the required SIB(s).
else
for the SI message(s) that, according to the si-SchedulingInfo, contain at least one required SIB and for which si-BroadcastStatus is set to broadcasting: acquire the SI message(s) from broadcast;
for the SI message(s) that, according to the si-SchedulingInfo, contain at least one required SIB and for which si-BroadcastStatus is set to notBroadcasting:
trigger DedicatedSIBRequest to acquire the required SIB(s).

Embodiment 1-3

Figure 3:
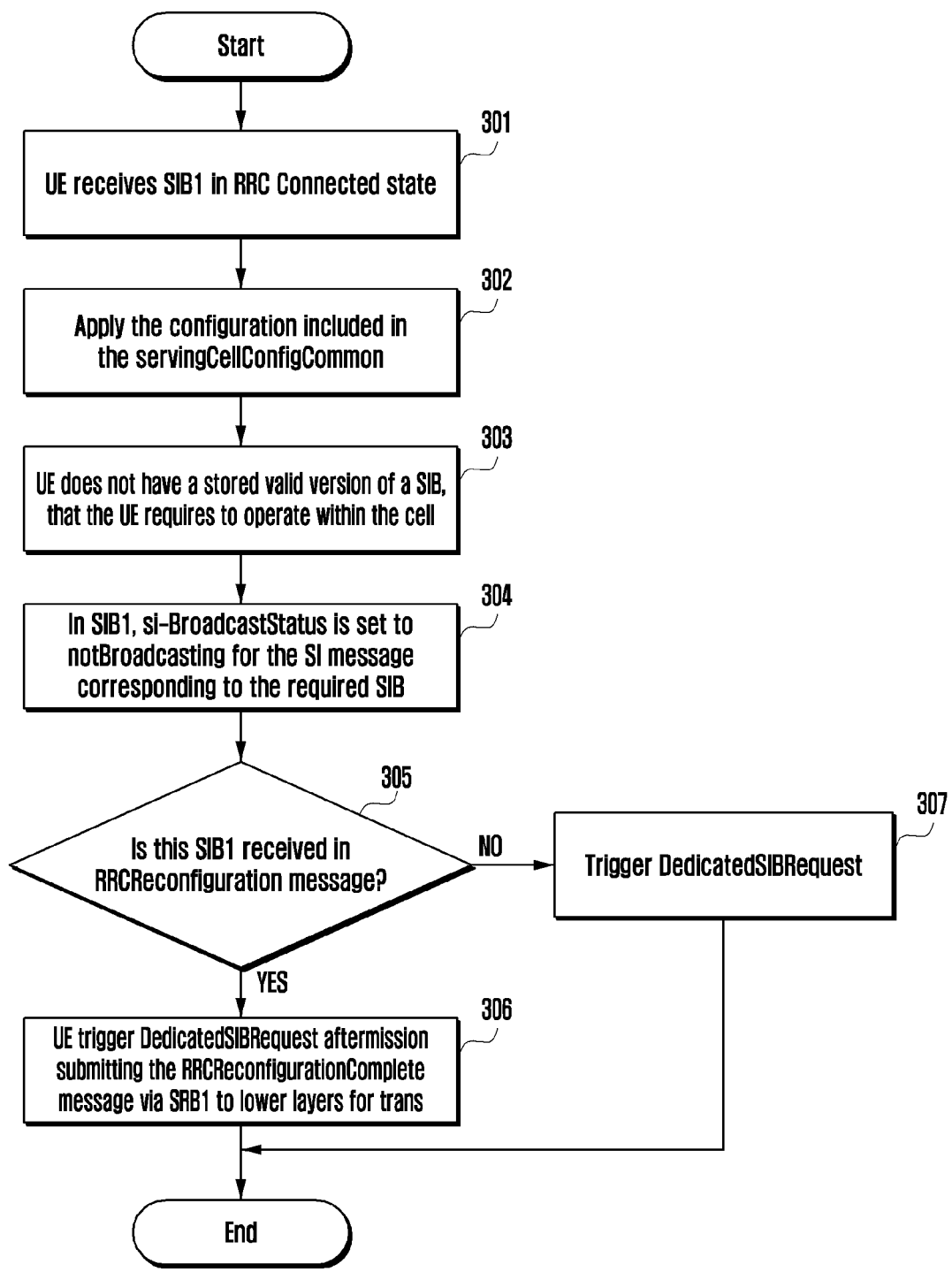
FIG. 3 illustrates a flowchart of processing of SIB1 received in RRC connected state in accordance with another embodiment of the disclosure.

FIG. 3 illustrates a flowchart of processing of SIB1 received in RRC connected state in accordance with another embodiment of the disclosure.

In step 301, UE receives SIB 1 in RRC Connected state. SIB 1 may be received in RRC reconfiguration message or acquired by UE from broadcast.

UE processes SIB 1 as follows:
if the cellAccessRelatedInfo contains an entry with the PLMN-Identity of the selected PLMN:
in the remainder of the procedures use plmn-IdentityList, trackingAreaCode, and cellIdentity for the cell as received in the corresponding PLMN-IdentityInfo containing the selected PLMN;
disregard the frequencyBandList, if received, while in RRC_CONNECTED;
forward the cellIdentity to upper layers;
forward the trackingAreaCode to upper layers;
apply the configuration included in the servingCellConfigCommon (302);
if the UE has a stored valid version of a SIB, that the UE requires to operate within the cell:
use the stored version of the required SIB;
if the UE has not stored a valid version of a SIB, of one or several required SIB(s) (303):
for the SI message(s) that, according to the si-SchedulingInfo, contain at least one required SIB and for which si-BroadcastStatus is set to broadcasting: acquire the SI message(s) from broadcast;
for the SI message(s) that, according to the si-SchedulingInfo, contain at least one required SIB and for which si-BroadcastStatus is set to notBroadcasting (304):
If this SIB1 is received in RRCReconfiguration message (i.e., in dedicatedSIB1-Delivery IE) (305):
UE trigger DedicatedSIBRequest after submitting the RRCReconfigurationComplete message via SRB1 to lower layers for transmission (306)
Else:
trigger DedicatedSIBRequest to acquire the required SIB(s). (307)

Alternatively, in step 303, if the UE has not stored a valid version of a SIB, of one or several required SIB(s):
for the SI message(s) that, according to the si-SchedulingInfo, contain at least one required SIB and for which si-BroadcastStatus is set to broadcasting and common search space is configured in active DL BWP: acquire the SI message(s) from broadcast;
for the SI message(s) that, according to the si-SchedulingInfo, contain at least one required SIB and for which si-BroadcastStatus is set to notBroadcasting or common search space is not configured in active DL BWP:
If this SIB1 is received in RRCReconfiguration message (i.e., in dedicatedSIB1-Delivery IE):
UE trigger DedicatedSIBRequest after submitting the RRCReconfigurationComplete message via SRB1 to lower layers for transmission
Else:
trigger DedicatedSIBRequest to acquire the required SIB(s).

According to another embodiment of the disclosure, in step 303, if the UE has not stored a valid version of a SIB, of one or several required SIB(s):
If this SIB1 is received in RRCReconfiguration message:
UE trigger DedicatedSIBRequest after submitting the RRCReconfigurationComplete message via SRB1 to lower layers for transmission
else
for the SI message(s) that, according to the si-SchedulingInfo, contain at least one required SIB and for which si-BroadcastStatus is set to broadcasting: acquire the SI message(s) from broadcast;
for the SI message(s) that, according to the si-SchedulingInfo, contain at least one required SIB and for which si-BroadcastStatus is set to notBroadcasting:
trigger DedicatedSIBRequest to acquire the required SIB(s).

Embodiment 2—Trigger to Transmit DedicatedSIBRequest

When UE is in RRC Connected state and UE wants to receive a SIB (e.g., V2X is activated and UE needs V2X SIB), and if UE does not have a stored valid version of a SIB, that the UE requires to operate within the cell, UE acquires the required SIB as follows:
If UE is in RRC IDLE/INACTIVE state:
UE first acquires SIB1. In an embodiment, if UE already has the acquired SIB1 in the current modification period and si-BroadcastStatus is set to Broadcasting for the required SIB in SIB1, UE does not need to acquire SIB1 (i.e., UE does not acquire SIB1 in this step).
If si-BroadcastStatus is set to notBroadcasting for the required SIB in acquired SIB1, UE triggers Msg1 or Msg3 based SI request. Whether to trigger Msg1 or Msg3 based SI request is explained earlier in this disclosure.
Else UE acquire the SI message of the required SIB from broadcast
Else (i.e., UE is in RRC Connected state):
If common search space is there in active DL BWP:
UE first acquires SIB1. In an embodiment, if UE already has the acquired SIB1 in the current modification period and si-BroadcastStatus is set to Broadcasting for the required SIB in SIB1, UE does not need to acquire SIB1 (i.e., UE does not acquire SIB1 in this step).
If si-BroadcastStatus is set to notBroadcasting in acquired SIB1:
UE triggers DedicatedSIBRequest
Else UE acquire the SI message of the required SIB from broadcast
Else:
UE trigger DedicatedSIBRequest
DedicatedSIBRequest message includes requestedSIB-List-r16. requestedSIB-List-r16 includes a list of required SIBs. In an embodiment, requestedSIB-List-r16 is a bitmap wherein each bit corresponds to different SIB. SIB 1 to SIB 9 are defined in release 15 (R15) of 3GPP standard. New SIBs will be further added in release 16 (R16). The issue is that which SIBs can be requested by requestedSIB-List-r16, and how the bits in requestedSIB-List-r16 are mapped to SIBs.

Embodiment 2-1

Only R16 SIBs can be requested by DedicatedSIBRequest.
First bit in requestedSIB-List-r16 corresponds to SIB 10, 2nd bit corresponds to SIB 11 and so on.
Alternatively, first bit in requestedSIB-List-r16 corresponds to SIB 2, 2nd bit corresponds to SIB 3 and so on. Bits corresponding to SIB2 to SIB 9 are always set to zero.

Embodiment 2-2

R16 SIBs and R15 SIBs can be requested by DedicatedSIBRequest.
First bit in requestedSIB-List-r16 corresponds to SIB 2, 2nd bit corresponds to SIB 3 and so on.

Embodiment 2-3

Only SIBs required in RRC Connected can be requested by DedicatedSIBRequest.
SIBs required in RRC Connected are pre-specified.
Bits in requestedSIB-List-r16 are mapped to SIBs required in connected in ascending order of SIB # starting from first bit.

Example

SIB 12, SIB 14 and SIB 16 are required in RRC Connected
First bit in requestedSIB-List-r16 corresponds to SIB 12, 2nd bit corresponds to SIB 14 and 3rd bit corresponds to SIB 16

Embodiment 2-4

R16 SIBs and SIB 6, 7 and 8 can be requested by DedicatedSIBRequest.
First bit in requestedSIB-List-r16 corresponds to SIB 6, 2nd bit corresponds to SIB 7 and so on.

Embodiment 3—si-BroadcastStatus Bit Setting in SIB1

All the contents in SIB1 are cell specific. So the contents of SIB1 transmitted on one or more DL BWPs of a serving cell is same. However it is not efficient to set the value of parameter si-BroadcastStatus corresponding to an SI message same in all DL BWPs. It is possible that SIB1 may be delivered to UE on a DL BWP using dedicated signaling and SI message(s) may not be broadcasted on that DL BWP as there is no common search space configured on that DL BWP. However in other DL BWP common search may be configured and SI message(s) may be broadcasted.

In one embodiment, if SIB1 is delivered or transmitted by gNB on a DL BWP (say BWP ID X), si-BroadcastStatus corresponding to SI message in SIB 1 is set to not broadcasting if the SI message is not broadcasted in DL BWP X. If SIB1 is delivered or transmitted by gNB on a DL BWP (say BWP ID X), si-BroadcastStatus corresponding to SI message in SIB1 is set to broadcasting if the SI message is broadcasted in DL BWP X.

In another embodiment, if SIB1 is delivered using dedicatedSIB1-Delivery IE by gNB, si-BroadcastStatus corresponding to SI message in SIB 1 is set to not broadcasting. If SIB1 is not delivered using dedicatedSIB1-Delivery IE by gNB (i.e., SIB1 is broadcasted by GNB), si-BroadcastStatus corresponding to SI message in SIB 1 is set to not broadcasting if the SI message is not broadcasted in DL BWP in which SIB1 is transmitted. If SIB1 is not delivered using dedicatedSIB1-Delivery IE by gNB (i.e., SIB1 is broadcasted by GNB), si-BroadcastStatus corresponding to SI message in SIB1 is set to broadcasting if the SI message is broadcasted in DL BWP in which SIB1 is transmitted.

Figure 4:
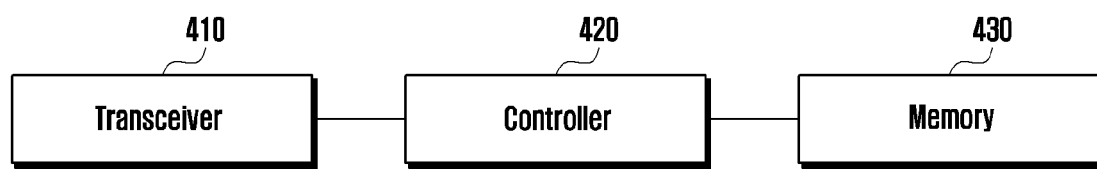
FIG. 4 is a block diagram of a terminal according to an embodiment of the disclosure.

FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the UE illustrated in the figures, e.g., FIGS. 1 to 3, or described above. Although the transceiver 410, the controller 420 and the memory 430 are shown as separate entities, they may be realized as a single entity like a single chip. Alternatively, the transceiver 410, the controller 420 and the memory 430 may be electrically connected to or coupled with each other.

The transceiver 410 may transmit and receive signals to and from other network entities, e.g., a base station.

The controller 420 may control the terminal to perform functions according to one of the embodiments described above. For example, the controller 420 controls the transceiver 410 and/or memory 430 to perform random access procedure related operations according to various embodiments of the disclosure.

In an embodiment, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using at least one processor or a central processing unit (CPU).

Figure 5:
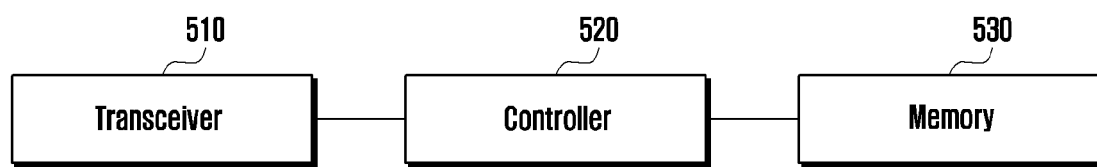
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520 and a memory 530. The controller 520 may refer to a circuitry, an application-specific integrated circuit (ASIC), or at least one processor. The transceiver 510, the controller 520 and the memory 530 are configured to perform the operations of the UE illustrated in the figures, e.g., FIGS. 1 to 3, or described above. Although the transceiver 510, the controller 520 and the memory 530 are shown as separate entities, they may be realized as a single entity like a single chip. Alternatively, the transceiver 510, the controller 520 and the memory 530 may be electrically connected to or coupled with each other.

The transceiver 510 may transmit and receive signals to and from other network entities, e.g., a terminal.

The controller 520 may control the UE to perform functions according to one of the embodiments described above. For example, the controller 520 controls the transceiver 510 and/or memory 530 to perform random access procedure related operations according to various embodiments of the disclosure.

In an embodiment, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, in a radio resource control (RRC) connected state, an RRC message from a source special cell (SpCell), the RRC message including a system information block 1 (SIB1);
identifying whether the RRC message includes information associated with a reconfiguration with sync for a target SpCell;
determining, based on the SIB1, to transmit a dedicated SIB request message for a SIB; and
transmitting, to the target SpCell, the dedicated SIB request message for a SIB after a random access procedure to the target SpCell is completed, based on the RRC message including the SIB1 and the information associated with the reconfiguration with sync.

2. The method of claim 1, wherein the random access procedure is completed, in case that a medium access control (MAC) of a master cell group (MCG) completes the random access procedure, and
wherein the information associated with the reconfiguration with sync includes information on a timer for a corresponding SpCell.

3. The method of claim 1, further comprising:
identifying whether a common search space is configured for an active bandwidth part (BWP),
wherein determining, based on the SIB1, to transmit the dedicated SIB request message for the SIB comprises identifying that the terminal has not stored a valid version of the SIB, and wherein the dedicated SIB request message is transmitted, in case that the common search space is not configured for the active BWP and the terminal has not stored the valid version of the SIB.

4. The method of claim 3, further comprising:
identifying whether a system information broadcast status is set to not broadcasting based on scheduling information included in the SIB1 for the SIB, and
wherein the dedicated SIB request message is transmitted, in case that the common search space is configured for the active BWP and the system information broadcast status is set to not broadcasting.

5. The method of claim 1, wherein the dedicated SIB request message is used to request the SIB which is required by the terminal in the RRC connected state.

6. A method performed by a target special cell (SpCell) in a wireless communication system, the method comprising:
performing a random access procedure with a terminal in a radio resource control (RRC) connected state with a source SpCell; and
receiving, from the terminal, a dedicated system information block (SIB) request message for a SIB,
wherein a transmission of the dedicated SIB request message by the terminal is determined based on a SIB 1 included in an RRC message transmitted from the source SpCell to the terminal, and
wherein the dedicated SIB request message is received after the random access procedure is completed, based on the RRC message including the SIB1 and information associated with a reconfiguration with sync for the target SpCell.

7. The method of claim 6, wherein the random access procedure is completed, in case that a medium access control (MAC) of a master cell group (MCG) completes the random access procedure, and
wherein the information associated with the reconfiguration with sync includes information on a timer for a corresponding SpCell.

8. The method of claim 6,
wherein the terminal has not stored a valid version of the SIB, and
wherein the dedicated SIB request message is received, in case that a common search space is not configured for an active bandwidth part (BWP).

9. The method of claim 6, wherein the dedicated SIB request message is received, in case that a common search space is configured for an active bandwidth part (BWP) and a system information broadcast status included in the SIB1 is set to not broadcasting.

10. The method of claim 6, wherein the dedicated SIB request message is used to request the SIB which is required by the terminal in the RRC connected state, and
wherein the SIB comprises at least one of SIB 12 or SIB 14.

11. A terminal in a wireless communication system, the terminal comprising:
a transceiver configured to transmit and receive a signal; and
a controller coupled with the transceiver and configured to:
receive, in a radio resource control (RRC) connected state, an RRC message from a source special cell (SpCell), the RRC message including a system information block 1 (SIB1),
identify whether the RRC message includes information associated with a reconfiguration with sync for a target SpCell,
determine, based on the SIB1, to transmit a dedicated SIB request message for a SIB, and
transmit, to the target SpCell, the dedicated SIB request message for a SIB after a random access procedure to the target SpCell is completed, based on the RRC message including the SIB1 and the information associated with the reconfiguration with sync.

12. The terminal of claim 11, wherein the random access procedure is completed, in case that a medium access control (MAC) of a master cell group (MCG) completes the random access procedure, and
wherein the information associated with the reconfiguration with sync includes information on a timer for a corresponding SpCell.

13. The terminal of claim 11, wherein the controller is further configured to:
identify that the terminal has not stored a valid version of the SIB, and
identify whether a common search space is configured for an active bandwidth part (BWP), and
wherein the dedicated SIB request message is transmitted, in case that the common search space is not configured for the active BWP and the terminal has not stored the valid version of the SIB.

14. The terminal of claim 13, wherein the controller is further configured to identify whether a system information broadcast status is set to not broadcasting based on scheduling information included in the SIB1 for the SIB, and
wherein the dedicated SIB request message is transmitted, in case that the common search space is configured for the active BWP and the system information broadcast status is set to not broadcasting.

15. The terminal of claim 11, wherein the dedicated SIB request message is used to request the SIB which is required by the terminal in the RRC connected state, and
wherein the SIB comprises at least one of SIB 12 or SIB 14.

16. A target special cell (SpCell) in a wireless communication system, the target SpCell comprising:
a transceiver configured to transmit and receive a signal; and
a controller coupled with the transceiver and configured to:
perform a random access procedure with a terminal in a radio resource control (RRC) connected state with a source SpCell, and
receive, from the terminal, a dedicated system information block (SIB) request message for a SIB,
wherein a transmission of the dedicated SIB request message by the terminal is determined based on a SIB 1 included in an RRC message transmitted from the source SpCell to the terminal, and
wherein the dedicated SIB request message is received after the random access procedure is completed, based on the RRC message including the SIB1 and information associated with a reconfiguration with sync for the target SpCell.

17. The target SpCell of claim 16, wherein the random access procedure is completed, in case that a medium access control (MAC) of a master cell group (MCG) completes the random access procedure, and
wherein the information associated with the reconfiguration with sync includes information on a timer for a corresponding SpCell.

18. The target SpCell of claim 16,
wherein the terminal has not stored a valid version of the SIB, and wherein the dedicated SIB request message is received, in case that a common search space is not configured for an active bandwidth part (BWP).

19. The target SpCell of claim 16, wherein the dedicated SIB request message is received, in case that a common search space is configured for an active bandwidth part (BWP) and a system information broadcast status included in the SIB1 is set to not broadcasting.

20. The target SpCell of claim 16, wherein the dedicated SIB request message is used to request the SIB which is required by the terminal in the RRC connected state, and
   wherein the SIB comprises at least one of a SIB 12 or a SIB 14.

* * * * *